United States Patent [19]

Standal

[11] 4,272,021

[45] Jun. 9, 1981

[54] PIPELINE DRAIN APPARATUS

[76] Inventor: Norman S. Standal, Star Rte., Bliss, Id. 83314

[21] Appl. No.: 122,708

[22] Filed: Feb. 19, 1980

Related U.S. Application Data

[63] Continuation of Ser. No. 850,917, Nov. 14, 1977, abandoned.

[51] Int. Cl.³ ............................................. A01G 25/09
[52] U.S. Cl. .................................. 239/106; 137/852; 137/877; 138/28; 138/30; 138/46; 138/93; 239/718; 239/533.15; 239/566; 251/61.1
[58] Field of Search ..................... 239/1, 11, 106, 107, 239/177, 183, 266, 533.15, 565, 709, 710–721; 251/61.1; 137/843, 852, 877; 138/28, 30, 46, 93, 115, 116, 119

[56] References Cited

U.S. PATENT DOCUMENTS

| | | | |
|---|---|---|---|
| 3,157,193 | 11/1964 | Purtell | 239/717 |
| 3,626,985 | 12/1971 | Erickson et al. | 138/115 |
| 3,998,392 | 12/1976 | St. Clair | 138/115 X |

FOREIGN PATENT DOCUMENTS 509746  6/1976  U.S.S.R. ................................... 137/843

Primary Examiner—Andres Kashnikow
Attorney, Agent, or Firm—Wells, St. John & Roberts

[57] ABSTRACT

A pipeline having a plurality of outlets spaced along its length is connected to a controllable supply of liquid under pressure. A transversely expandable and collapsible bladder is fixed in position within the pipeline interior and extends along its length to overlap the locations of the outlets. Air or other compressible gaseous material is provided within the bladder at a pressure less than the supply liquid pressure, causing the bladder to be expanded to substantially fill the interior of the pipeline when it is emptied of liquid. When the connection between the liquid supply and lateral pipeline is open, the bladder is collapsed within the pipeline to permit passage of liquid to the outlets. When the connection is closed, the pressurized bladder is permitted to expand and thereby expel liquid remaining within the pipeline through the outlets. Longitudinally spaced compressible plugs are located between the outlets to prevent gravitational flow of liquid during draining of the pipeline.

7 Claims, 10 Drawing Figures

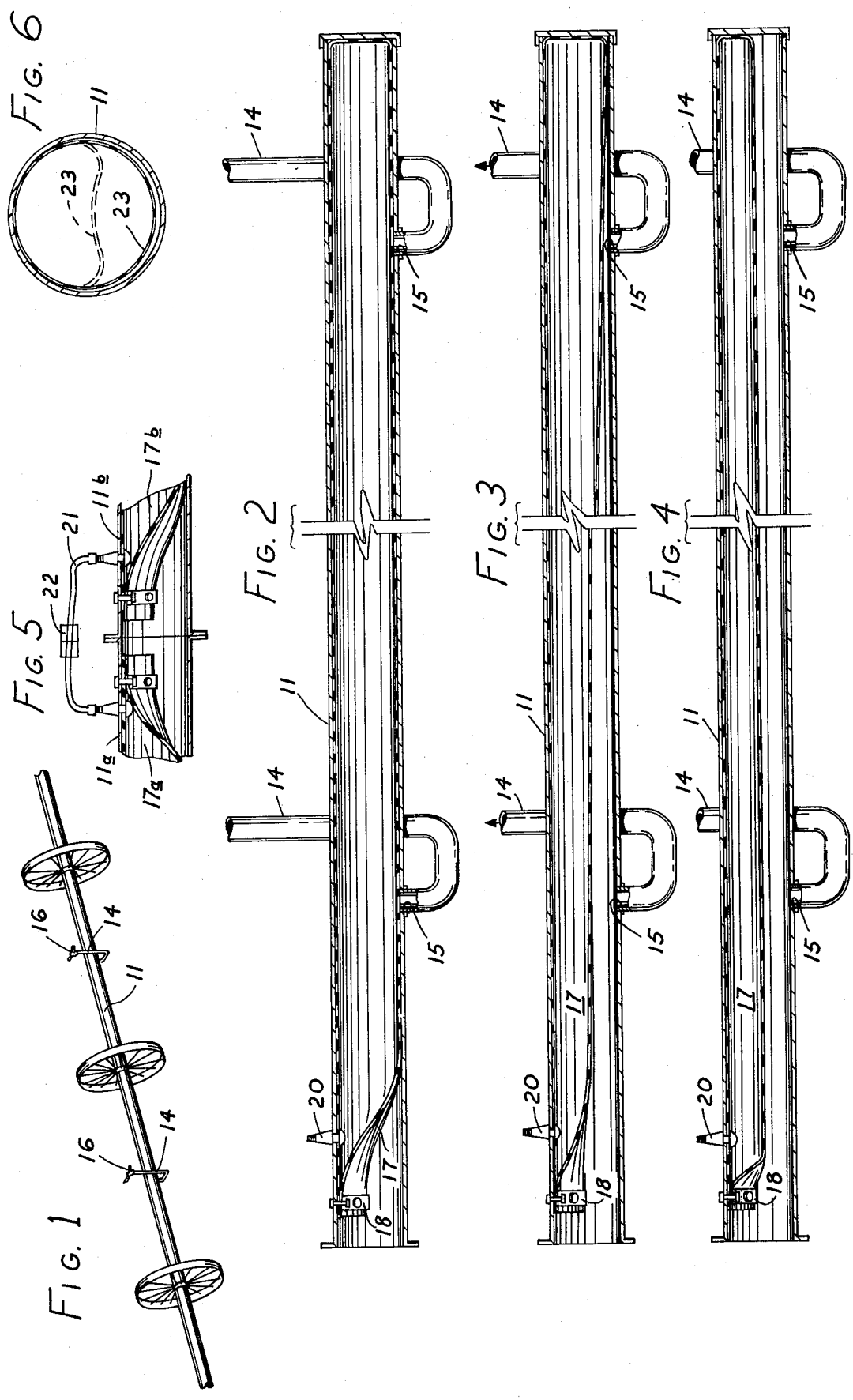

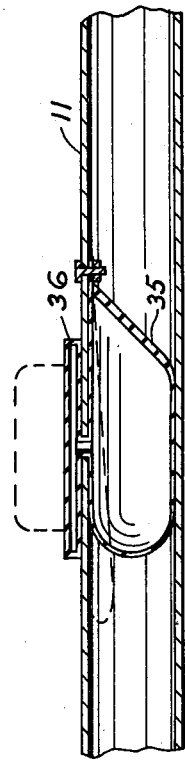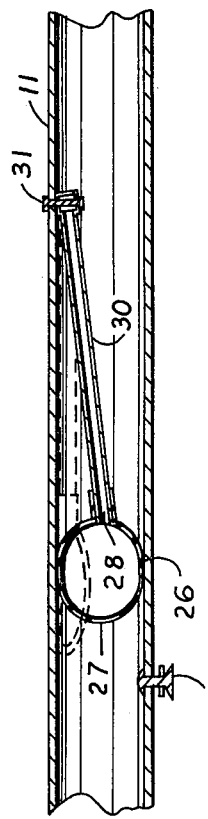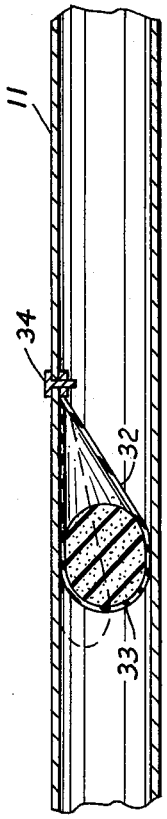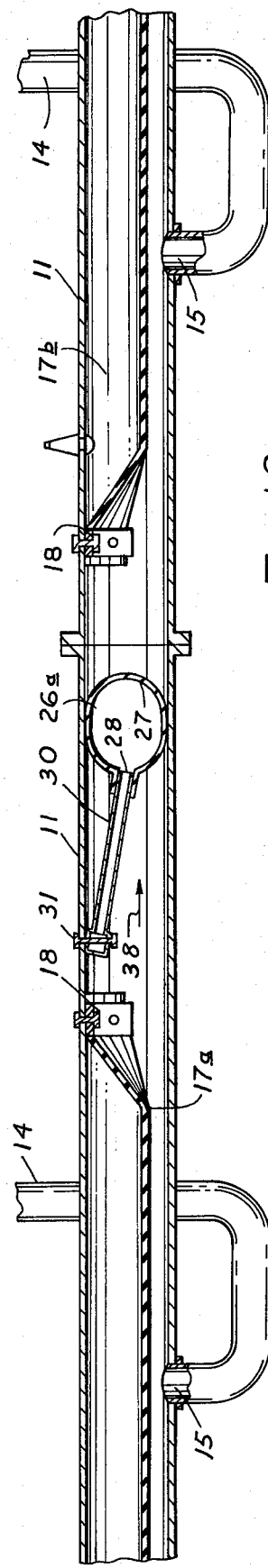

PIPELINE DRAIN APPARATUS

This is a continuation of co-pending patent application Ser. No. 850,917, filed Nov. 14, 1977 and abandoned upon the filing of this application.

BACKGROUND OF THE INVENTION

This disclosure relates to intermittently pressurized liquid pipelines which are drained of liquid when not pressurized. It is particularly applicable to movable pipelines which are drained to reduce their weight prior to movement.

This disclosure specifically illustrates application of the invention to portable sprinkler irrigation systems presently utilized in agriculture for distributing large volumes of irrigation water over adjacent field areas. Water is supplied under pressure from a main line connected to a pump and source of water. Water is distributed across the field through an elongated lateral pipeline. The lateral pipeline is selectively coupled to the main line through a control valve which can be opened or closed to control flow of water from the main line to the lateral pipeline. The lateral pipeline is typically connected at one end to the main line. The remaining end of the lateral pipeline is enclosed. A plurality of risers and sprinkler heads are arranged along the length of the lateral pipeline in hydraulic communication with its interior. They are selected and spaced to assure the desired distribution of water along adjacent field areas.

The portable lateral pipeline can be moved about the field in many different ways. If it rests directly on the ground, it can be dismantled and moved. However, it is advantageous to drag the pipeline lengthwise as a unit and eliminate the steps of dismantling and reconnecting the lateral pipeline sections. More commonly, the pipeline is supported on wheels or skids to permit it to be moved about the field in a direction perpendicular to its length. In a wheel move system, the pipe itself is the driving axle for the wheels. In a line move system, separate carriages support and move a nonrotatable lateral pipeline.

Most portable irrigation systems utilize lightweight conduit in the portable lateral pipeline and require draining of the lateral pipeline before it is moved, thereby minimizing the weight of the unit and the stresses encountered by the moving pipeline. Since the risers and sprinkler heads are directed upwardly from the lateral pipeline, water within the pipeline cannot drain through them by gravity when the supply valve has been closed. Automatic draining of portable lateral pipelines has been accomplished by providing pressure responsive valves along the bottom of the pipeline. Such valves are opened by springs when the water pressure decreases due to closing of the control valve. Since the water being dumped from the lateral pipeline by such valves might be deflected over a relatively small area under the drain valves, the result is an uneven distribution of water over a relatively small area and substantial waste of that volume of water filling the lateral pipeline at the time the system is shut down. In addition, after the pipeline has been moved and reconnected to the main line, it is necessary that the drain valves progressively close along the length of the lateral pipeline in response to the increase in pressure of the water flowing along its length. Another substantial volume of water is again wasted about small areas under the drain valves during the transition period as they are closing. The usage of such drain valves also results in wasted time during which the lateral pipeline is either being emptied or pressurized.

DESCRIPTION OF THE DRAWINGS

FIG. 1 is a simplified schematic view of the sprinkler irrigation system;

FIG. 2 is an enlarged fragmentary vertical section taken along the length of the lateral pipeline while emptied of water;

FIG. 3 is a sectional view similar to FIG. 2, illustrating distribution of water through the pipeline and sprinkler heads;

FIG. 4 is a sectional view similar to FIG. 3, showing the expulsion of water by the inflated bladder;

FIG. 5 is a fragmentary vertical section view through adjacent sections of a pipeline in an alternate embodiment of the invention;

FIG. 6 is a transverse sectional view through the lateral pipeline and an alternate bladder configuration;

FIG. 7 is a fragmentary vertical sectional view showing a compressible plug;

FIG. 8 is a view of a second embodiment of the plug;

FIG. 9 is a view of a third embodiment of the plug; and

FIG. 10 is a fragmentary view showing a pipeline having both bladders and plugs.

DESCRIPTION OF THE PREFERRED EMBODIMENTS

This description relates generally to pipelines having plural outlets which are periodically drained and specifically to portable sprinkling systems used for irrigating agricultural fields.

The basic conventional features of a sprinkler irrigation system include a main line used to convey water under pressure along one side of the field area to be irrigated. The main line may be portable or stationary. Although it is usually buried, it is sometimes located on the ground surface. In either case, tees and shut off valves are provided at suitable intervals along the main line to permit connection of the sprinkler lateral pipeline. An illustrative portable sprinkler system is shown in U.S. Pat. No. 3,195,563, hereby incorporated by reference.

A portable lateral pipeline 11 (FIG. 1) is arranged across a field area to be irrigated. The lateral pipeline 11 is typically operated in an intermittent fashion. It is moved from one tee to another along the main line while drained or emptied of water. One end of the lateral pipeline 11 is then connected in hydraulic communication to the main line through a selected tee. The corresponding shut off valve is then opened to direct water under pressure to the interior of the lateral pipeline.

Various conventional arrangements are provided for moving the lateral pipeline 11 about the field area. These include skids and wheel assemblies which can be utilized to move the pipeline 11 either parallel to its length or perpendicular to its length, depending upon the particular system used. In some systems the lateral pipeline 11 is supported on or adjacent the ground. In other systems it is elevated by wheels or carriages, providing crop clearance for movement purposes.

The lateral pipeline 11 is typically made from aluminum tubing. It is relatively light and must be drained of water before moving it about the field, since the system is normally not designed for movement of the loads encountered in a lateral pipeline filled with water.

Water is distributed about the field area adjacent to the lateral pipeline 11 through a plurality of longitudinally spaced outlets in the form of risers 14 and sprinkler heads 16 which have outer nozzles designed for even distribution of the water. The upright risers 14 are in hydraulic communication with the interior of the lateral pipeline 11 through riser openings 15, which are arranged along a common side of the lateral pipeline 11. In the arrangement shown in the drawings at FIGS. 2-4, the riser openings 15 are located at the bottom of the lateral pipeline 11. However, they can be arranged to project directly from the top of the lateral pipeline 11 or to either side of it.

The improved apparatus for sprinkling a field by use of this system and for facilitating draining and pressurization of the lateral pipeline 11 can best be understood by a study of FIGS. 2, 3, and 4. In addition to the conventional sprinkler system elements described above, there is provided an elongated bladder 17 located within the lateral pipeline 11 and overlapping the locations of risers 14. Bladder 17 is either elastic or nonelastic. It must be collapsible and expandable in a transverse direction within the pipeline in response to water pressure within the lateral pipeline 11. As an example, bladder 17 might be an elongated length of rubber or plastic tubing having a cross-sectional cylindrical configuration. The material from which bladder 17 is constructed must be gas-impervious. Its ends are sealed to present a gas enclosure extending along the interior of the lateral pipeline 11. Air or other compressible gaseous material is selectively introduced to the interior of bladder 17 through a valve stem 20 or other suitable means in communication with its interior. The illustrated valve stem 20 is similar to the typical valve stem used for inflation of automobile tires, and is sealed about the wall of lateral pipeline 11 as well as about an opening through the bladder 17.

Referring to FIGS. 2 and 4, the bladder 17 is anchored at its upstream end by means of a bolted clamp 18. Clamp 18 secures one end of bladder 17 to the upper interior surfaces of the lateral pipeline 11. Bladder 17 might be fixed within pipeline 11 by any desired arrangement, including the use of adhesives either at one end or along its full length. The bladder 17 should be substantially constant in length so that it does not stretch under the forces exerted thereon by water pressure within the lateral pipeline 11. It should be transversely expandable in a uniform manner along the length of the pipeline 11.

In the first embodiment of the apparatus (FIGS. 2 through 4), the bladder 17 is represented as a rubber tube similar in structure to an elongated inner tube for tires. It is located within the interior of pipeline 11 at a location or locations diametrically opposite to the riser openings 15. Air is directed into the bladder 17 through the valve stem 20 at a pressure and volume adequate to cause the bladder 17 to substantially fill the interior of the lateral pipeline when emptied of water (FIG. 2). The air pressure is less than the supply water pressure at main line 10. As an example, assuming a supply water pressure of 60 p.s.i.g., the bladder 17 might be inflated to a pressure of 15 p.s.i.g. By selecting a bladder configuration having an uninflated exterior diameter either identical to or slightly less than the interior diameter of pipeline 11, such gaseous pressure within the laterally expandable bladder 17 will assure that the inflated bladder will substantially fill the interior of pipeline 11 when it is emptied.

When water flows through the pipeline 11 (FIG. 2), the supply water pressure will compress the bladder 17 and the air within it, bringing the air into static balance with the water pressure. Assuming water pressure of "60" p.s.i.g., the air pressure will be increased to 60 p.s.i.g. also. However, since the volume of water progressively decreases along the length of lateral pipeline 11, the resulting configuration of bladder 17 will be tapered; the cross-sectional area through bladder 17 will be less at the upstream end of pipeline 11 and will be at a maximum at its downstream or closed end. One advantage of the use of a bladder 17 according to this disclosure is that the inflated bladder acts as a pressure accumulator arranged along the entire length of lateral pipeline 11 and regulates the water pressure at each riser 14, providing balanced water pressure along the full length of the pipeline 11 to a degree not found in conventional systems where the volume of water along the length of the lateral pipeline is constant, the cylindrical rigid conduit being always filled with water.

When the shut off valve connecting the main line to the lateral pipeline 11 is closed, the pressurized bladder is permitted to expand and thereby expel water remaining within the lateral pipeline 11. Since the water is then in a static condition, the bladder 17 will contract or expand along the length of pipeline 11 to present a constant cross-sectional area (FIG. 3). The expandable gas within bladder 17 forces the water through the riser opening 15, risers 14, and sprinkler heads 16 to distribute the drained water in a normal sprinkler pattern. While the sprinkler pressure is gradually reduced to the pressure within bladder 17, this should be sufficiently great to meet the normal nozzle requirements for a full spray pattern during most of the duration in which the water is being drained from lateral pipeline 11.

After the pipeline 11 has been emptied of water, the bladder 17 fills the interior of it. Its interior pressure and frictional engagement against the inner pipe surfaces prevents it from moving within the pipeline as the system is moved about the field.

The bladder is a significant aid during pressurization of the lateral pipeline 11 at the next field position. When the shut off valve to the main line is opened, the water is directed to the upstream end of the lateral pipeline 11 by progressively collapsing bladder 17. As the bladder 17 clears each riser opening 15, the water can be immediately directed through the corresponding sprinkler head 16. It has been found that this occurs progressively along the length of the pipeline 11, the sprinkler heads being activated in a regular timed sequence. This is contrasted with conventional lateral pipelines using pressure operated drain valves (not shown). In such systems, the entire length of the lateral pipeline 11 must be filled with water to a pressure above that needed to close the valves, and all of the sprinkler heads 16 are then activated at substantially the same time. During the time needed to achieve such pressurization, substantial amounts of water are lost through the drain valves. The escaping water is unevenly distributed in a narrow area immediately adjacent the pipeline 11.

FIG. 5 shows an arrangement for a bladder to permit uncoupling of adjacent sections along the pipeline 11. The pipeline sections 11a and 11b are fixed to one another by a conventional coupler. The bladder is illustrated as being formed in two separate lengths, designated as bladder sections 17a and 17b. The bladder structure is essentially that described above, but is produced in sealed elongated segments, rather than one continuous element extending the full length of the lateral pipeline 11. If desired, an optional pneumatic connection can be made between the interiors of the bladder section 17a and 17b. This is illustrated as a connecting tube 21 and a manually releasable coupler 22. The bladder sections 17a and 17b can be individually inflated. In either form, they will operate in substantially the same manner as described above.

FIG. 6 illustrates a transverse section of a bladder formed of nonelastic tubing 23. The material utilized for the tubing 23 does not stretch, but is capable of collapsing and expanding to its normal cylindrical configuration. The cylindrical shape of the tubing 23 is shown in full lines. A collapsed configuration is shown in dashed lines. Tubing 23 might be a reinforced length of flexible hose reinforced by fibers which prevent it from expanding. By utilizing tubing having a normal exterior cylindrical diameter slightly less than the interior diameter of pipeline 11, one can assure free passage of water of at least a minimum volume throughout the entire length of pipeline 11. This will eliminate any concern that an elastic bladder might bulge unevenly and prevent passage of water at a particular point. While the expanded tubing 23 will not expel all of the water within pipeline 11, substantially all of the water will be emptied and the small amount remaining between the space separating tubing 23 and pipeline 11 will not be detrimental to movement of the sprinkler system.

An exterior accumulator or air reservoir, (not shown) might be mounted to pipeline 11 in some situations to allow for increased volume changes in the bladder, thereby permitting the moving water to more completely fill the lateral pipeline.

The bladder 17 operates to expel water from the pipeline 11 in the manner illustrated in FIGS. 2 through 4 so long as the pipeline is in a horizontal position. With the pipeline 11 horizontal, bladder 17 forces the liquid within the pipeline to exit from the several longitudinally spaced outlets in a uniform manner, with the water flow distributed among the several outlets. However, actual tests have shown that if pipeline 11 is longitudinally inclined, the gravitational flow of liquid within the pipeline will at least partially overcome the pressurization achieved by bladder 17 and the downhill flow of water will tend to cause the water to collect adjacent those outlets at a lower elevation. This gravitational flow disrupts the desired expulsion of liquid through those outlets at a higher elevation.

To counter this downward flow, some means should be provided to prevent longitudinal movement of liquid within the pipeline during the draining process. A compressible plug for this purpose is shown in several forms in FIGS. 7 through 10.

The basic elements of the plug can be understood from a study of FIG. 7. A section of pipeline 11 is shown containing an outlet illustrated as a conventional drain valve 25 of the type conventionally used in sprinkler irrigation systems. Valve 25 is a spring-biased valve that is closed when the pipeline is pressurized and opened when the pressure within pipeline 11 is relieved.

The plug 26 basically comprises a collapsible enclosed bag 27 having an outlet 28 in sealed communication with the interior of a tube 30. One end of tube 30 is fixed to the wall of pipeline 11 by a suitable fastener, such as a threaded nut and bolt assembly 31 extending through an aperture in the pipeline wall. The tube 30 serves as an air reservoir and is not collapsible. Bag 27 is of flexible material, such as plastic or rubber, and has a transverse circular configuration with an exterior diameter normally slightly greater than the interior surface diameter within pipeline 11. Bag 27 might have either a spherical normal shape or a cylindrical normal shape when inflated.

With the pipeline 11 pressurized by the liquid flowing through it, the air or gas within bag 27 is compressed and partially forced within the noncompressible tube 30. The flow of liquid forces bag 27 against the interior walls of pipeline 11 to present only a minimal restriction in the interior pipeline diameter. However, when the flow of water ceases and the pipeline is no longer pressurized, the compressed air or gas within tube 30 and bag 27 will cause the bag 27 to assume its normal enlarged shape (shown in full lines in FIG. 7), thereby filling the area within the pipeline 11 and obstructing longitudinal flow of liquid past the plug 26. In this way, placement of a plug 26 between individual pipeline outlets or groups of outlets will limit gravitational flow of liquid along the length of the pipeline 11 and tend to distribute the draining water among the several outlets.

FIGS. 8 and 9 show alternative structural forms of the plug. In FIG. 8, a flexible bag 32 contains a compressible foam ball 33 selected from a material capable of being deformed to a compressed shape shown in dashed lines under the design pressure normally encountered within pipeline 11. Bag 32 is anchored by a suitable fastener shown generally at 34. The plug operates in the same manner as described with respect to FIG. 7.

FIG. 9 shows another form of the plug, wherein it comprises a flexible interior bag 35 in communication with an exterior reservoir 36, which can be either rigid or flexible. The compressed gas within the two chambers allows the bag 35 to collapse in response to liquid pressure within the pipeline 11 and to expand within pipeline 11 when the pipeline is no longer pressurized. Bag 35 again is anchored by suitable fastener 37.

FIG. 10 shows the manner by which this plug can be utilized between two sections of a compressible bladder of the type described in detail with respect to FIGS. 1 through 6. The two lengths of bladder shown at 17a and 17b are separated by a plug indicated generally as 26a and shown in the form described specifically with respect to FIG. 7. The flow of water along pipeline 11 is indicated by arrow 38. So long as the pipeline 11 is pressurized and liquid is flowing through it, both bladder sections 17a and 17b, as well as plug 26, will remain compressed to permit flow of liquid to the longitudinally spaced outlets along the pipeline 11. However, when the pipeline 11 is no longer pressurized by the interior liquid, the air pressure within plug 26 will cause it to expand across the walls of the pipeline 11 and thereby prevent longitudinal flow of liquid. This will permit the individual bladders 17a and 17b to force liquid through the outlets spanned by them. By spacing the plugs 26 between individual bladder sections, one can minimize the delay that would otherwise occur in draining the pipeline because of the gravitational flow of water along an elevationally inclined length of the pipeline. This is of particular importance in a sprinkler irrigation installation, since such pipelines rarely rest on absolutely level ground surfaces.

Plug 26 is useful with respect to any arrangement where multiple outlets along a pipeline are drained at differing elevations. It can be used with a wide variety of multiple pipeline outlets such as conventional drain plugs, and can be used with or without the compressed air bladders capable of forcing liquid through the pipeline risers or other outlets.

These improvements effectively distribute the water which must be drained from the pipeline, spreading it over the field by the conventional sprinklers so that the water can be efficiently used by the growing crops. They substantially shorten the time necessary to drain the pipeline and the time necessary to pressurize it when the system has been reset. This time saving is of particular importance in irrigation systems which have automated devices for moving and resetting lateral pipelines.

Modifications might be made in the basic structure without deviating from the general concepts set out herein.

Having described my invention, I claim:

1. In combination with an irrigation pipeline having cylindrical walls made of rigid material and having a plurality of longitudinally spaced sprinkler outlets open through said walls along one side of the pipeline;
    an apparatus for draining liquid from within the irrigation pipeline, comprising:
    elongated sealed bladder means located within the pipeline, said bladder means having a length that longitudinally overlaps the sprinkler outlets along said one side of the pipeline;
    said bladder means being expandable and collapsible in transverse directions within the pipeline toward or away from the sprinkler outlets overlapped thereby along said one side of the pipeline;
    said bladder means containing compressible gas at a pressure and volume adequate to cause the bladder means to expand toward the walls of the pipeline when the pipeline is empty of water, such gas pressure being less than a predetermined supply water pressure for the pipeline;
    and means for introducing water under said predetermined supply water pressure to the space between said bladder means and said one side of the pipeline.

2. An apparatus as set out in claim 1 further comprising: means for fixing at least a portion of said bladder means to the pipeline interior along a side of the pipeline opposite to said sprinkler outlets along said one side of the pipeline.

3. An apparatus as set out in claim 1 wherein said bladder means is constant in length and is transversely expandable and collapsible in a continuous manner along such length.

4. An apparatus as set out in claim 1 wherein said bladder means comprises:
    an elongated length of gas impervious cylindrical tubing fabricated from collapsible nonelastic material, the tubing being sealed at its ends and having an inflated exterior diameter slightly less than the interior pipeline diameter.

5. An apparatus as set out in claim 1 wherein the pipeline is constructed of interconnected sections arranged end-to-end;
    said bladder means comprising:
    individual sealed bladder elements within each pipeline section coextensive in length with the respective pipeline sections;
    and means for providing open hydraulic communication between the ends of adjacent bladder elements within the pipeline.

6. An apparatus as set out in claim 1, further comprising:
    compressible plug means anchored along the pipeline interior outward from the bladder means for traversing the cross-sectional interior area of the pipeline when the pipeline is not pressurized, said plug means being pressed against a portion of the interior walls of the pipeline in response to the supply water pressure to permit passage of the water.

7. An apparatus for intermittently blocking water flow along a cylindrical irrigation pipeline having multiple outlets along the length thereof, comprising:
    a compressible enclosed plug having a normal spherical or cylindrical shape including a circular transverse configuration with an exterior diameter normally slightly greater than the interior surface diameter within the pipeline and being capable of traversing the interior cross-sectional area across the pipeline in the absence of water pressure within the pipeline;
    fastener means for fixing said plug to one side of the pipeline at a location within the pipeline interior intermediate a pair of adjacent selected outlets along the length of the pipeline;
    said plug being compressible against said one side of the pipeline in response to the water pressure within the pipeline so as to permit passage of pressurized water between said selected outlets.

* * * * *